J. KOEHLER.
FISHING APPARATUS.
No. 77,893. Patented May 12, 1868.
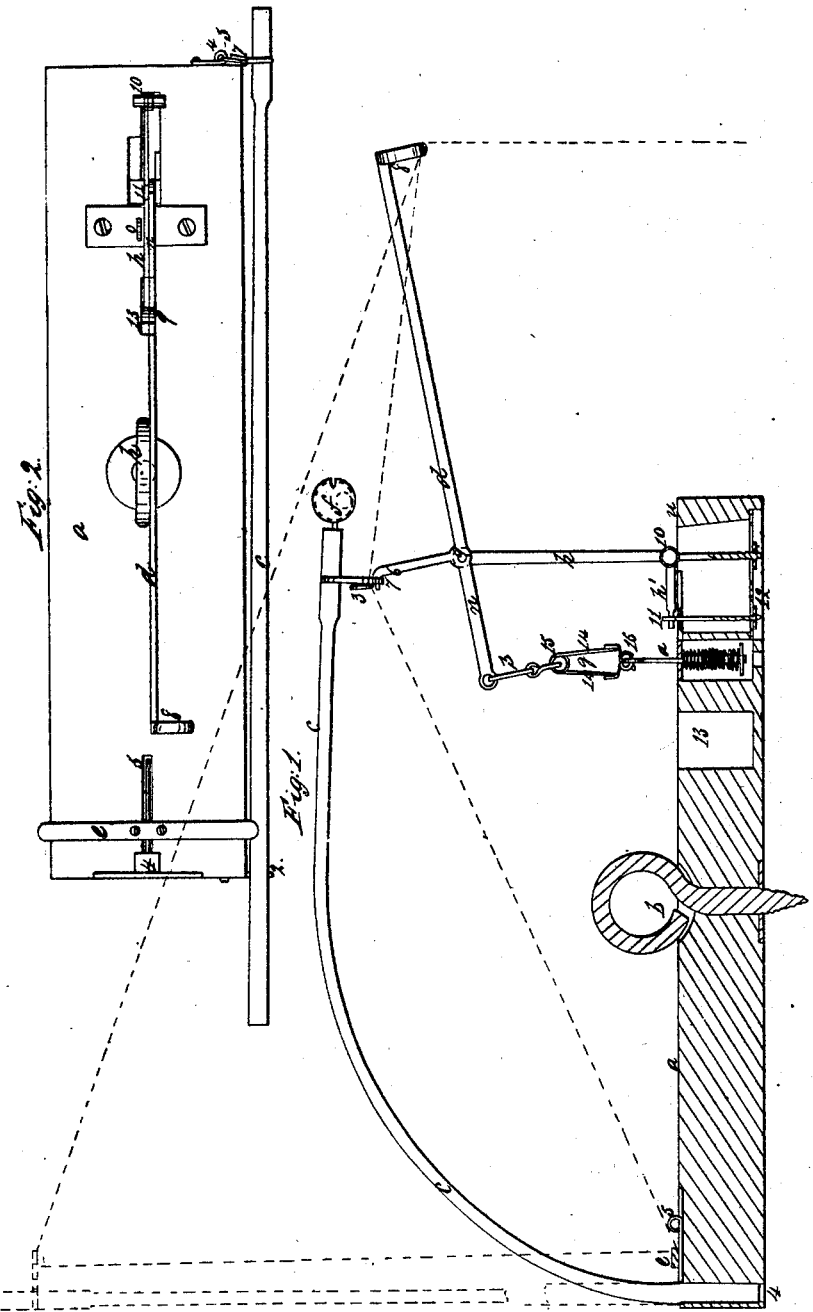

United States Patent Office.

JOSEPH KOEHLER, OF NEW YORK, N. Y.

Letters Patent No. 77,893, dated May 12, 1868.

---

IMPROVEMENT IN FISHING-APPARATUS.

---

The Schedule referred to in these Letters Patent and making part of the same.

---

TO ALL WHOM IT MAY CONCERN:

Be it known that I, JOSEPH KOEHLER, of the city and State of New York, have invented, made, and applied to use a certain new and useful Improvement in Fishing-Apparatus; and I do hereby declare the following to be a full, clear, and exact description of the said invention, reference being had to the annexed drawing, making part of this specification, wherein—

Figure 1 is a side view of the apparatus as set for use, the stock being in section.

Figure 2 is a plan of the apparatus in a folded form for transportation.

Similar parts are referred to by like letters.

In fishing, it becomes very tedious to constantly hold the line in the hand, and jerk the same with rapidity when the fish bites, and if the line is left for a moment the bait may be eaten off.

The nature of my said invention consists in a spring jerk and lever-trigger, over which the line is laid, the parts being secured to a stock in such a manner that when the fish bites at the bait the lever-trigger will be disconnected from the spring, which, recoiling, jerks the line to fasten the hook in the fish's mouth.

I construct my apparatus in such a manner that it may be folded into a small compass for transportation, and when in use it may be easily screwed to a wharf, gunwale, pier, or other wood-work, where the party is fishing, so that he does not have to hold any portion of the line or apparatus.

In the drawing, $a$ is the stock, carrying the parts of my apparatus. This stock is provided with a thumb-screw, $b$, with a gimlet-point, by means of which the stock can be firmly attached to any wood-work convenient for fishing.

$c$ is the spring that acts, when disengaged, to jerk the line. This spring, when not in use, is laid at one side of the stock in the spring-holder 2, at one end of said stock, and the other end of said spring is held in place by the hook 3 being connected with the eye 4.

The band, by which the hook 3 is attached to the spring $c$, sets within a neck, near the end of the spring, so that it can be turned around to accommodate the other parts, regardless of the direction in which the base of the spring may be set into the socket 4 at the end of the stock $a$.

This spring $c$, in its normal condition, stands at right angles, or nearly so, to the stock $a$, and is secured by the bolt 5. When, however, the apparatus is set for catching fish, the spring $c$ is strained or bent down to the lever-trigger $d$, where the catch 6 takes into an eye, 7, near the hook 3, and holds the spring.

The line is laid across the hook 3, and a hook, 8, at the end of the lever $d$, and thence passes to the spring hold-fast $e$. As soon as the fish pulls on the line, the lever $d$ is moved, drawing the catch 6 from the eye 7, so that the spring $c$ flies back, and jerks upon the line suddenly and violently, to cause the hook to catch firmly into the fish's mouth.

A small bell, $f$, at the end of the spring $c$, calls attention to the apparatus when discharged, and the struggling of the fish shows, by the bending of the spring and the ringing of the bell, that a fish has been caught.

This spring $c$ might be made as an arm extending from a coiled or helical spring, if preferred.

The fulcrum 9 is an arm, $h$, that is secured to the stock $a$ by the joint 10, and an arm, $h'$, at right angles to the arm $h$, is held by an eye, 11, that is fitted so that it can be slipped along in a slot in the stock $a$, so that the eye 11 passes over the end of $h'$, and is held in position by the nut 12. When this nut 12 is released, and the eye slipped back out of the way, the arm $h'$ can be turned down into the stock $a$, the arm $h$ coming down upon the face of the stock $a$, as seen in fig. 2, the catch 6 entering a mortise, 13, in the stock, and the trigger-lever lying at the side of the arm $h$.

It will be evident that when the parts are folded together they occupy but little space, hence can be easily carried from place to place.

In order to be able to make use of a sinker, and not have the weight thereof operate the trigger-lever, I employ the adjustable steel-yard $n$, that is made with a spring acting upon a follower that also becomes the nut for the screw-rod $o$ of the steel-yard eye; and $p$ is a chain connecting said eye (of $o$) with the end of the lever

*d*, so that as much power can be applied by adjusting the rod *o* as will counteract the weight of the sinker and line under the motion of the vessel or water to which it may be subjected.

The spring-hook *q* forms a convenient connection between the chain and eye *o*. This spring-hook *q* is formed with the arms 14 that extend from the spring-coil 15, and cross each other, terminating as returned hooks 16, so that the hooks 16 will be separated when the arms 14 are pressed toward each other.

What I claim, and desire to secure by Letters Patent, is—

1. The trigger-lever *d*, applied substantially as specified, in combination with the spring-jerk, the parts receiving the fishing-line as set forth.

2. The swinging arm *h*, in combination with the trigger-lever and holding-eye 11, or its equivalent, so that the parts may be folded as set forth.

3. The steel-yard *n*, in combination with the trigger-lever *d* and jerk-spring *c*, substantially as and for the purposes set forth.

4. The spring-hook *q*, formed of the arms 14, extending from the coil 15, and terminating in the reverse hooks 16, so that the hooks can be opened by pressing the arms 14 toward each other, as set forth.

In witness whereof, I have hereunto set my signature, this sixth day of April, 1868.

JOSEPH KOEHLER.

Witnesses:
GEO. D. WALKER,
GEO. T. PINCKNEY.